United States Patent [19]

Giuliani et al.

[11] Patent Number: 4,709,883

[45] Date of Patent: Dec. 1, 1987

[54] LAUNCH AND ASCENT SYSTEM

[76] Inventors: Robert L. Giuliani, 1456 Thurston Ave. A-1204, Honolulu, Hi. 96822; Mark A. Giuliani; Karen A. Giuliani, both of 45-310 Akimala Pl., Kaneohe, Hi. 96744

[21] Appl. No.: 726,152

[22] Filed: Apr. 22, 1985

[51] Int. Cl.[4] .............................................. B64F 1/04
[52] U.S. Cl. ................................. 244/63; 244/114 R; 244/2; 104/281; 104/290
[58] Field of Search ............. 244/2, 63, 114 R, 158 R; 104/281, 282, 285, 290, 291

[56] References Cited

U.S. PATENT DOCUMENTS

| | | | |
|---|---|---|---|
| 2,404,984 | 7/1946 | Powers | 104/290 |
| 2,921,756 | 1/1960 | Borden et al. | 244/63 |
| 3,267,809 | 8/1966 | Sikora | 244/63 |
| 3,325,124 | 6/1967 | Bang | 244/114 R |
| 3,589,300 | 6/1971 | Wipt | 244/63 |
| 3,672,606 | 6/1972 | Walley | 244/2 |
| 3,964,398 | 6/1976 | Breitling | 104/281 |
| 4,265,416 | 5/1981 | Jackson et al. | 244/63 |

OTHER PUBLICATIONS

"Scientific American", Oct. 1973, pp. 17-25.
"Popular Mechanics", Feb. 1985, p. 74.
"The Annular Flow Electrothermal Ramjet", B. D. Shaw, C. E. Mitchell & P. J. Wilbur, Jun. 25, 1984, Colorado St. Univ.
"Science Digest", Jan. 1985, pp. 59-61.
"High Technology", Sep. 1984, pp. 34-36.
"Science Digest", Mar. 1985, p. 49
"Popular Science", Oct. 1984, pp. 76, 77.
"Space World", Jan. 1985, p. 19.
"Science 84", Aug., pp. 77-78.
"Popular Mechanics", Nov. 1983, pp. 92-93.
"Essential Techniques in MAGLEV Transportation", Quarterly Reports of the Railway Technical Institute, vol. 25, No. 1, Mar. 1984, pp. 13-18.

Primary Examiner—Joseph F. Peters, Jr.
Assistant Examiner—Rodney Corl

[57] ABSTRACT

This invention uses magnetic levitation in combination with magnetic propulsion (MAGLEV) to accelerate an aircraft of spacecraft—or both crafts as a coupled unit—from standstill along a guideway to the highest possible launch velocity. The acceleration along the guideway is fuel efficient. The craft(s) are brought to launch velocity without using on board fuel. The computer controlled acceleration along the guideway could avoid high g forces to prevent damage to fragile payloads. The guideway may be sectionalized and of any shape. One section, for instance, may be circular to permit a long magnetically accelerated run with a relatively short length guideway. Very heavy crafts and payloads can be launched with superconducting levitation magnets in the guideway which form strong repulsive force fields with superconducting magnets in the MAGLEV vehicle. In another embodiment, the invention includes attraction magnets for the levitation. The invention could operate in an airless environment, such as the moon, to launch rocket powered spacecraft with their payloads. On earth, the invention could launch a rocket powered spacecraft coupled to an aircraft having air breathing engines. The aircraft would power the spacecraft to a staging altitude, where the spacecraft would actuate its own rocket engines for propulsion beyond the atmosphere, and separate from the aircraft. Unlike the space shuttle, all major components of the invention's space launch would be recovered for reuse. The invention may be multipurpose for serving to efficiently launch conventional aircraft. With a circular guideway, takeoff is inherently omnidirectional to take advantage of launch conditions.

6 Claims, 3 Drawing Figures

LAUNCH AND ASCENT SYSTEM

FIELD OF THE INVENTION

This invention is in the field of launch and ascent systems that use magnetic propulsion and levitation for accelerating spacecraft and aircraft from a standstill to a high launch velocity.

BACKGROUND OF THE INVENTION

It would be a major advancement in the art if spacecraft and aircraft could be accelerated from standstill to a maximum allowable launch (takeoff) velocity under controlled g forces without using on board fuel and be able to recover all major elements of the system for reuse.

Spacecraft and aircraft have been conventionally launched either from a vertical or horizontal takeoff. The horizontal mode, well established for aircraft, requires completing an accelerating run along a runway to gain minimum launch velocity. The helicopter and NASA's well known space shuttle use the vertical takeoff mode. In both these modes, it is well known that the craft must use on board fuel very inefficiently to accelerate from a standstill. In the case of the space shuttle, the inefficiency leads to discarding expensive elements of its system without recovery.

NASA—in U.S. Pat. No. 4,265,416—overcomes some of the several objections to the space shuttle's vertical launch concept by mounting a space craft piggy back fashion on a pair of aircraft. The pair use their turbojet engines for a conventional takeoff run and then power the combination to a staging altitude. At staging altitude, the spacecraft separates and continues into orbit under its own rocket engine power. The pair of aircraft descend to a landing at its base. Unlike the shuttle, this two stage system recovers all the major components for reuse, however, it does not overcome the inefficient acceleration of the entire heavy system from a standstill to a minimum takeoff velocity with on board fuel. The accelerated weight includes the heavy on board fuel used for the acceleration as well as the heavy support structure for the fuel.

The British have proposed a reusable single stage unmanned launch system for a spacecraft[2,8]. This system would use a combination of air breathing and rocket engines. It would be launched from conventional runways used by commercial aircraft. Like the NASA system, this invention uses on board fuel to very inefficiently accelerate the entire load from a standstill to a minimum takeoff speed.

A proposal to lift a spacecraft to a staging altitude with a jet aircraft is envisioned by at least one potantial space entrepeneur[6]. The U.S. military uses variations of this concept to launch missiles from an aircraft to destroy vehicles in space. This concept also uses on board fuel to inefficiently accelerate the entire load from a standstill.

Other established methods for launching payloads into space include two stage expendable rocket powered vehicles used for deep space probes, but this costly procedure also inefficiently launches the vehicle from a standstill, using on board fuel.

Studies have been done on the electrothermal ramjet concept for propelling very small payloads into space[3]. This idea uses ramjet principles to accelerate a payload to escape velocity within a vertical tube mounted on a ground structure. The payload would encounter extremely high g forces (reportedly 3,000 to 30,000) and is limited to a maximum mass of about 10 kg. Obviously, these conditions limit the payload to a very few types.

All the concepts envisioned above are limited to launching payloads from within an oxygen atmosphere, such as earth has, with the exception of the conventional shuttle and the expendable rocket vehicles. All these concepts, including the shuttle and the expendable rocket vehicles, are imprctical for large scale operations on an airless world like the moon because of the large fuel requirements which are not readily available in a moon environment, at least not within the present state of the art.

The mass driver concept has been proposed for launching payloads into space[4]. This is a catapult system similar in principle to the electrothermal ramjet idea except that the payload is accelerated along a guideway to escape velocity by magnetic force fields. The payload is not self propelling so it must reach escape velocity before leaving the force fields. It is proposed primarily for catapulting payloads from the surface of the moon where there is no atmospheric interference and the escape velocity is much less than on earth. Nevertheless, the payload mass is limited and the high g forces (reportedly 700 to 1,100) limits the type of payload. A human payload, for instance, would be hard pressed to survive 700 g.

An essential component of this invention is the magnetic propulsion of a magnetically levitated load along a guideway from a standstill to a high takeoff velocity. The idea of magnetic force fields to levitate and propel a load along a guideway has been known for many years[1,9]. This idea has been applied to train transportation[1]. Generally termed MAGLEV, it has successfully demonstrated accelerating a 224,000 pound vehicle to speeds of over 200 mph over a 20 mile test track[10]. A train holds the MAGLEV speed record of 321 mph and has the potential to reach 500 mph[9]. This speed record train was magnetically levitated four inches above its guideway.

Ground based MAGLEV technology uses two types of magnetic forces to levitate a load above a conducting guideway. There is the attractive magnetic force where two properly positioned magnets attract each other. One of these attractive magnets is held by the load and attracted upward to a magnet on a T shaped rail but does not touch it. This inherently unstable condition was used to safely accelerate the 224,000 pound vehicle mentioned above. The second type of force used is repulsive levitation caused by magnetic force fields between a magnet and, either, an induced field in a conductor or a second magnet of the same polarity. For practical reasons, the repulsive scheme uses a superconducting magnet in the vehicle to generate a very strong field. The conductor in the guideway can be coil or a continuous sheet. If the magnetic force at the surface of a continuous-sheet guideway is 20 kilogauss (about the strength at the pole face of a good magnet) the lift force is 60 pounds per square inch[1]. The MAGLEV speed record of 321 mph, mentioned above, used the repulsive with superconductors in the train.

For a practical guideway, using the repulsive method, lift begins at about 20 mph and is fully implemented, with the help of a wheeled support system, beginning at about 60 mph[1,5]. However, by electrifying the guideway, rather than relying on an induced field, the repulsive magnets could levitate at any speed[5].

In both methods, attractive and repulsive, there is a separate set of magnets for propulsion. The load is propelled by alternating the currents in the moving magnets and the stator magnets in the guideway[5]. The frequency of alternating the currents must be synchronized with the speed of the load. This synchronization and the levitation became practical with the advent of computer controlled solid state switching devices.

MAGLEV technology for use in transportation is encountering obstacles in spite of its significant advantages such as low guideway maintenance, low running energy compared to auto and airplane[11], etc. In addition to capital cost and skepticism, there are real technical obstacles that MAGLEV for train transportation encounters which are avoided with its use in the present invention.

| U.S. PATENT DOCUMENTS | | | |
|---|---|---|---|
| 4,265,416 | 5/1981 | Jackson, et. al. | 244-2 |

| OTHER PUBLICATIONS | |
|---|---|
| 1. | Scientific American, Oct 1973, pp. 17–25 |
| 2. | Popular Mechanics, Feb 1985, pg. 74 |
| 3. | Paper, "The Annular Flow Electrothermal Ramjet", B. D. Shaw, C. E. Mitchell & P. J. Wilbur, Jun 25, 1984, Colorado State Univ. |
| 4. | Science Digest, Jan 1985, pp. 59–61 |
| 5. | High Technology, Sept 1984, pp. 34–36 |
| 6. | Science Digest, Mar 1985, p. 49 |
| 7. | Popular Science, Oct 1984, pp. 76, 77 |
| 8. | Space World, Jan 1985, p. 19 |
| 9. | Science 84, Aug, pp. 77–78 |
| 10. | Popular Mechanics, Nov 1983, pp. 92–93 |
| 11. | Quarterly Reports of the Railway Technical Institute, Vol 25, no. 1, Mar 1984, "Essential Techniques in MAGLEV transportation", pp. 13–18 |

SUMMARY

This invention comprises a launch and ascent system for spacecraft and aircraft. The craft is combined with a magnetically levitated and propelled vehicle (MAGLEV) which accelerates the combination from a standstill to a maximum allowable velocity along a grounded guideway before releasing the craft for take off. A two stage system would be comprised of the MAGLEV vehicle carrying an aircraft along the guideway on earth or, analogously, a spacecraft on an airless world like the moon.

A three stage system would be comprised of the MAGLEV vehicle as the first stage; a second stage aircraft mounted on the MAGLEV vehicle; and a third stage spacecraft with the payload mounted on the aircraft. When the MAGLEV vehicle reaches a launch velocity on its guideway, the second stage craft would separate and ascend to a staging altitude by using its on board fuel. There, the third stage spacecraft would separate from the aircraft and continue carrying the payload into space using its own on board fuel and rocket engines. After separation at staging altitude, the second stage aircraft would return to its ground base for reuse.

In this invention, a MAGLEV guideway can be constructed in any shape but a circular guideway with connecting sections has been selected for presentation in this disclosure. The guideway preferably includes superconducting magnets. Superconducting magnets are also preferably carried on the MAGLEV vehicle. The strong force field between the opposing superconducting magnets permit the multistage vehicles and payload to be very heavy while maintaining good clearance between the MAGLEV vehicle and the guideway.

In other embodiments, the invention also includes conventional electromagnets in the attractive MAGLEV concept.

The MAGLEV concept described herein is particularly adaptable for launches from the moon or other airless worlds because lack of convection heat there allows the superconducting magnets to remain cold and retain energy by simply placing the guideway and vehicle under a structure that offers shade from the sun. Maximum launch velocity can be reached by the MAGLEV because there is no atmospheric interference.

It is an object of this invention to reduce weight and conserve fuel in launching aircraft or spacecraft by using magnetic propulsion and levitation to accelerate the craft from a standstill to a maximum allowable take off speed.

Another object is to reduce acceleration forces upon sensitive payloads.

Another object is a space launch system with all reusable components.

Another object is a practical launch system from the surface of an airless world.

Another object is to reduce launch costs for space and atmosphere missions.

Another object is to avoid technical obstacles encountered in MAGLEV operation over long linear distances requiring many hours of constant operation from supercooled magnets.

Other objects and improvements over the prior art will become apparent from the following description and accompanying drawings.

DESCRIPTION OF THE PREFERRED EMBODIMENTS

Figure 1:
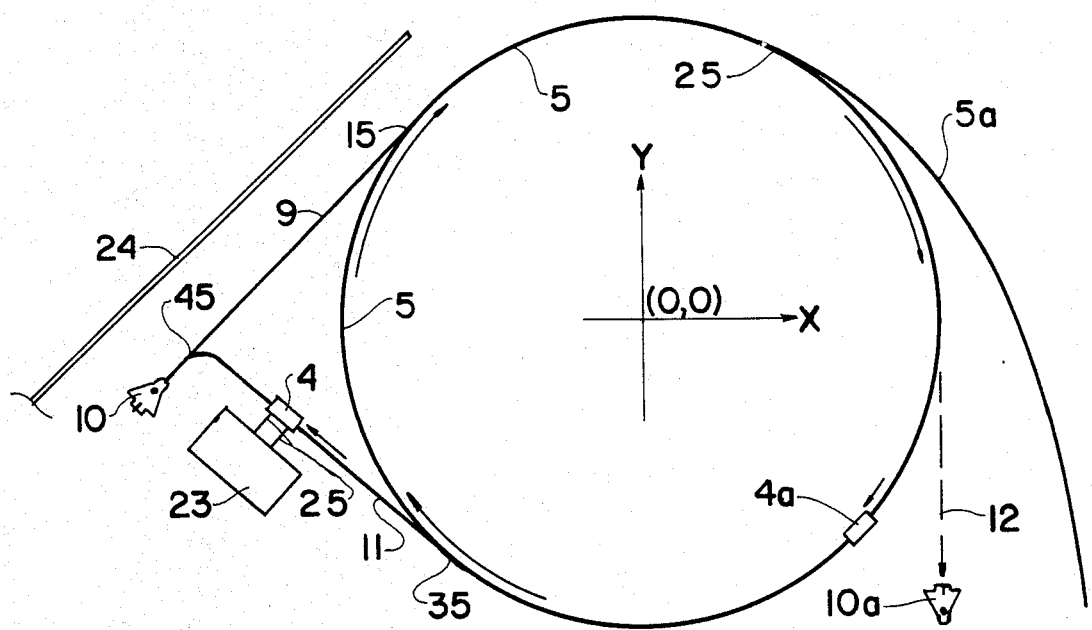
FIG. 1 shows a top view of one of the preferred launch configurations.

A launch system comprising a magnetically levitated and propelled vehicle 4 (MAGLEV); a MAGLEV guideway 5; an aircraft 2; and a spacecraft 1 has been selected for detailed description herein as the preferred embodiment for launch from the earth. In FIG. 1, a conventional runway 24 is shown for landing the aircraft 2 after returning from staging altitude where it launches the spacecraft 1 under the spacecraft's own rocket engine power. The runway 24 also handles spacecraft 1 that return from their missions. A comparable embodiment for launches from the surface of the moon would comprise a MAGLEV vehicle 4; MAGLEV guideway 5; and spacecraft 1. A third emodiment for launching aircraft only comprises the MAGLEV 4; MAGLEV guideway 5; and a conventional aircraft 2.

For brevity herein, the aircraft 2 and spacecraft 1 will be referred to as the "launched crafts 10" when it is clear that the two function as a combined unit, for instance, after take off from the MAGLEV guideway 5. The term "load 4" will be used in reference to the combined spacecraft 1, aircraft 2, and MAGLEV vehicle 4 when it is obvious that they are to be taken as an operational unit on any part of the sectionalized guideway.

The MAGLEV guideway, shown in FIG. 1, has a circular section 5 with an on ramp 9 and off ramp 11. It also has a connecting involute section 5a leading into a linear part. The linear section may be sloped upward for giving the launched crafts 10 the best attitude at take off. The section 5a serves to give a high speed launch with a fragile payload under reduced g forces.

Figure 2:
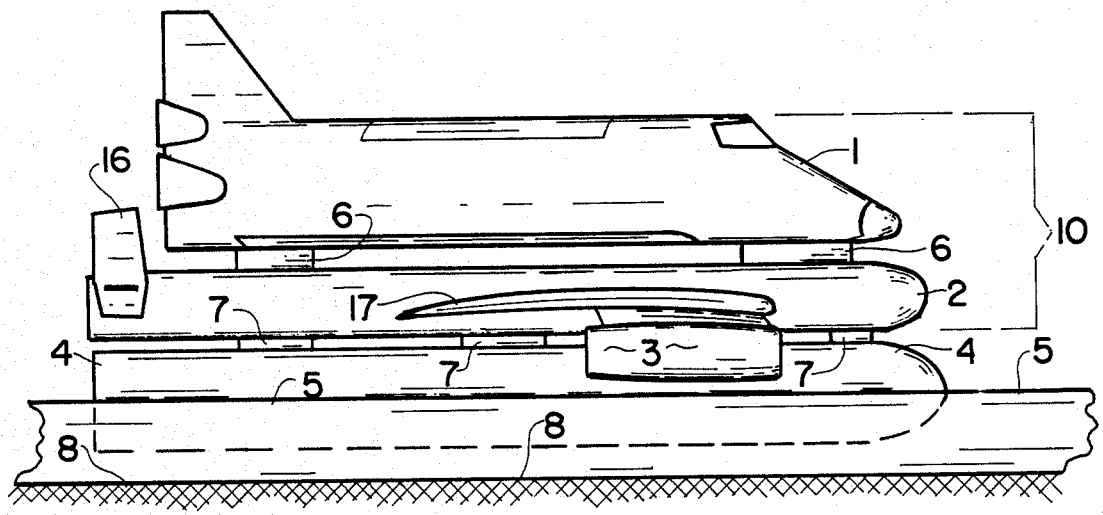
FIG. 2 shows a side view of the piggy back arrangement of the multi stage system selected for detailed description herein.
Figure 3:
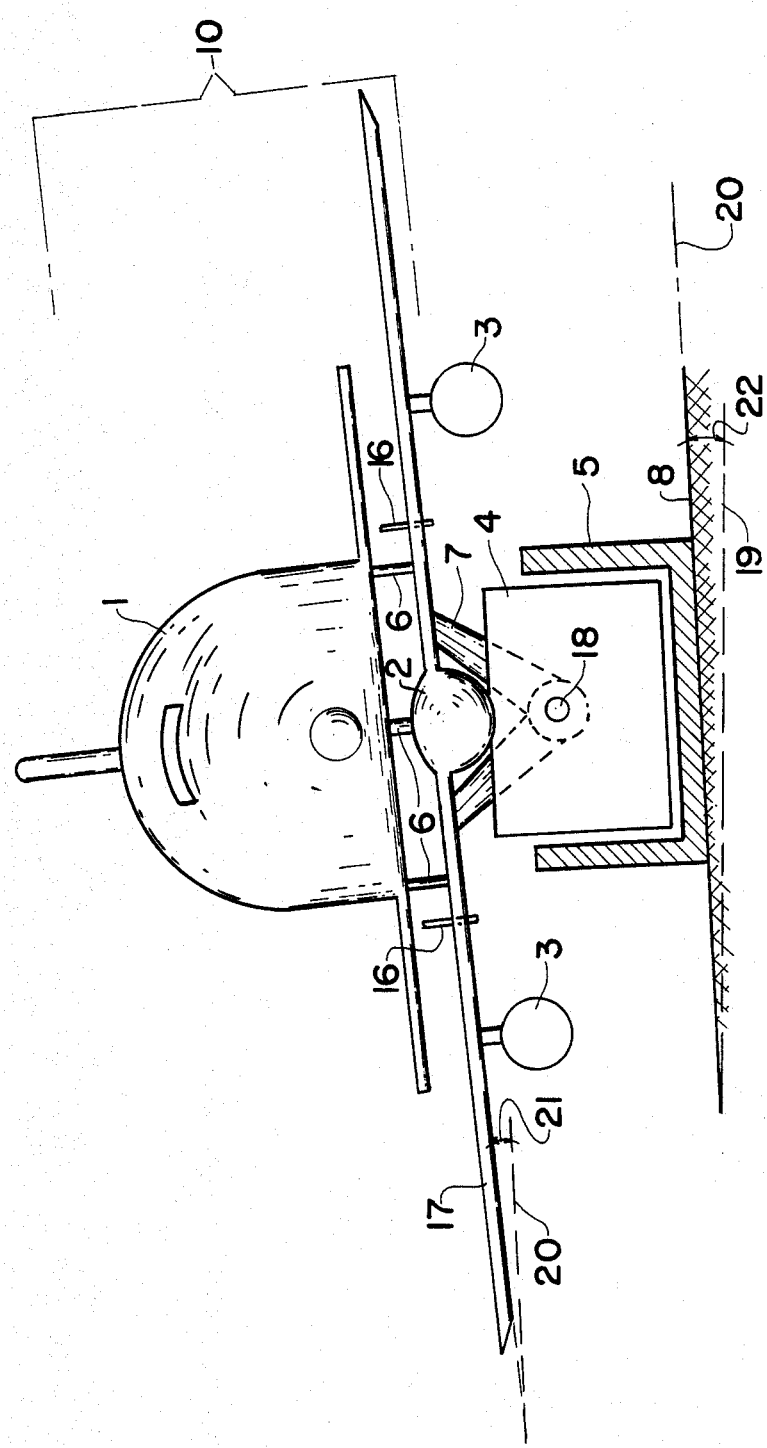
FIG. 3 shows a front view of FIG. 2.

FIG. 2 and FIG. 3 show the spacecraft 1 piggy backed on an aircraft 2 with couplings 6. The couplings are constructed to separate the spacecraft 1 from the aircraft 2 near staging altitude. The couplings 6 may include exploding bolts or other standard methods to accomplish the separation.

The launch crafts 10 are further piggy backed on a MAGLEV vehicle 4 shown in FIG. 2 and FIG. 3. The aircraft 2 has conventional wings 17 and tail 16 for lift and control. There are enough air breathing engines 3 on aircraft 2 to power the launch crafts 10 after separating from the speeding MAGLEV vehicle 4 to a staging altitude where the spacecraft 1 separates from the aircraft 2 at the couplings 6.

The aircraft 2 may be any suitable design known in the art. The aircraft 2 shown in the drawings is remotely controlled. Its fuselage is really a fuel tank, shaped and structured to support the piggy backed spacecraft 1.

The spacecraft 1 may also be any suitable design. The spacecraft shown in the drawings is patterned after the well known shuttle with lift and control surfaces primarily for use during reentry but also for contributing lift to the load 4 at high speeds on the guideway sections 5 and 5a.

The circular section 5 is slanted toward the center at a fixed angle 22 so that the MAGLEV vehicle 4 is also given the same initial slant. The angle 22 is somewhat dependent upon the diameter of the circular guideway 5 and the initial speed of the load 4 upon entering the circular section 5 from the on ramp 9. The on ramp 9 is also preferably constructed as a MAGLEV guideway. The gate switch 15 in the guideway, constructed according to methods known in the art[7], allows the load 4 to enter the section 5. The bank angle 22 keeps the load from overwhelming the magnetic levitation fields at slow speeds and becoming unbalanced.

A tiltable structure—adjustment 7—is part of the MAGLEV vehicle 4. The aircraft 2 is releasably coupled directly to the adjustment 7. The adjustment 7 adjusts the bank of the launch crafts 10 through angle 21 as the MAGLEV 4 accelerates the load. The angle 21, FIG. 3, shows the slant of the launch crafts 10 relative to the slant angle 22 of the MAGLEV 4. The aerodynamically shaped adjustment 7 is shown pivotally connected to the MAGLEV 4 by pin 18. As the load 4 increases speed, the wings 17 will offer lift to relieve the centrifugal forces upon the MAGLEV 4 by banking the launch crafts 10 on pivoting pin 18. Other means, such as hydraulic pistons, may be used in place of the adjustment 7.

A gate switch 35 is opened to allow the MAGLEV 4a to enter the off ramp 11 after the launch crafts 10a have been released along flight path 12 as shown in FIG. 1.

The guideway 5, on ramp 9 and the MAGLEV vehicle 4 are preferably all constructed with superconducting magnets to handle very heavy launch crafts 10. When a slow acceleration for fragile payloads is required, a circular guideway 5 has an advantage over a long linear guideway up to a certain speed because the load 4 would use the same part of the guideway as it circles to gain speed. Capital and maintenance cost on the guideway would be reduced. Launching of lightweight load 4 using the induced field of a guideway conductor would reserve the guideway super magnets and their refrigeration costs for launching the heavy load 4 thereby giving the guideway multipurpose use. Attractive magnetism is also a preferable embodiment of this invention for suspending and propelling the MAGLEV 4 with its launch crafts 10.

A maintenance building 23 is shown situated nearby the off-ramp 11. The MAGLEV 4 will weigh much less at the off-ramp part of the guideway without the launch crafts 10. The lightweight MAGLEV 4 allows the off-ramp part of the guideway to be constructed with a sheet conductor only. When the MAGLEV 4 reaches a point in front of the maintenance building 23, it could be settled on wheels at low speed and stopped. At this point, a small section of the off-ramp 11 could be rotatable to allow the MAGLEV 4 to be aligned with tracks 25 so that it could be rolled into the maintenance building 23. Notice that a mission could be aborted on guideway 5 and slowed by alternating the polarities of the propulsion magnets in reverse, then slowly move the load 4 back down the on-ramp 9 to its load point.

OPERATION

The load 4 is loaded at the beginning of the on-ramp 9 shown in FIG. 1. The load 4 shown in FIGS. 2, 3 is comprised of the MAGLEV 4, aircraft 2 and spacecraft 1. The loading can be accomplished with known methods, i.e. ramps, hoists, cranes, etc. Using magnetic propulsion and levitation—in combination with wheels at initial speeds in some cases—the load 4 is magnetically propelled along the on-ramp 9 and enters the circular part of guideway 5 through a gate switch 15 at the intersection of guideway 5 and ramp 9.

The load 4 continues to accelerate in the direction of the arrows in FIG. 1 until a desired velocity is reached when either of two events can occur in the guideway configuration shown in FIG. 1. In the first event, the launch crafts 10a can separate from MAGLEV 4 and take off directly from the circular section 5 on flight path 12 as shown in FIG. 1. The flight path is inherently omnidirectional which allows the most advantageous take off conditions for each flight. In the second event, the load 4 is diverted to the involute guideway 5a through gate switch 25. The involute 5a is curved so that a high velocity load 4, diverted onto the involute is relieved of some of the centrifugal force imposed when it was on circular guideway 5. On the involute 5a, the load is given a final acceleration, from the velocity that it received on the circular section 5, to the maximum allowable take off velocity. The involute generally slopes upward and smoothly forms into a final section which is substantially linear so that the launch crafts 10 are in the best take off attitude. The load 4 may circle the guideway 5 several times before the proper velocity is reached. The g forces resulting from forward acceleration are negligible on the circular guideway. The take off velocity is preferably as high as possible under operational conditions.

At low speeds, the adjustment structure 7 will be locked by conventional methods to prevent tilting. The locking will keep angle 21 the same as angle 22. As the load accelerates, the wings 17 of aircraft 2 will provide lift and, to a lesser degree, so will the wings of spacecraft 1. The tail section 16 of aircraft 2 will contribute to control of the load 4 on the guideway 5 and 5a, if 5a is used. In other words, the aircraft 2 will fly in the three vehicle configuration of load 4 (FIGS. 2, 3) while circling the guideway 5 and before separating from MAGLEV 4.

As the aircraft 2 provides lift and control, the adjustment 7 will be unlocked so that the adjustment is free to tilt on pin 18 through angle 21. The aircraft 2 will then controllably adjust the tilt angle 21 so that the aircraft maintains a controlled attitude that gives controlled lift at the wings. Note that all the power needed to accelerate load 4 on the entire guideway is provided by the magnetic force fields between the MAGLEV 4 and the guideway. The lift provided at wings 17, and to a lesser extent, by wings on spacecraft 1, will counteract the centrifugal force from the speeding load 4 so that the magnetic levitation forces between MAGLEV 4 and the guideway are not overwhelmed.

FIG. 1 shows an x,y coordinate system with origin (0,0) at the center of the circular guideway. Using this coordinate system, the acceleration A of the speeding load 4 toward the center of the circle to overcome centrifugal force can be determined by simple mathematics:

I. Let $V$ be the velocity vector of the load with respect to time. Let $r$ be the radius of the circular guideway 5. Then:

$$v_x = \pm \frac{V \cdot y}{r} \quad v_x = \text{velocity along the } x \text{ axis}$$

$$v_y = \pm \frac{V \cdot x}{r} \quad v_y = \text{velocity along the } y \text{ axis}$$

$$a_x = \frac{V^2 \cdot v_y}{(v_x \cdot y - v_y \cdot x)} \quad \text{acceleration in the } x \text{ direction}$$

$$a_y = \frac{V^2 \cdot v_x}{(v_x \cdot y - v_y \cdot x)} \quad \text{acceleration in the } y \text{ direction}$$

$$A = \sqrt{a_y^2 + a_x^2} \quad \text{acceleration towards center of circle}$$

$$A_t = \sqrt{A^2 + A_g^2} \quad \text{total acceleration including gravitational acceleration } A_g = 32.16 \text{ ft/sec}^2$$

$$G = A_t/A_g \, g \quad \text{forces on the load}$$

Example 1. Determine the g forces when $V = 700$ ft/sec = 477 mph; $r = x = 5280$ ft = one mile; $y = 0.0$. These values for $x$ and $y$ are easy to use, however, any point on the circular guideway may be chosen to get the same answer. The chosen values are also the launch point of the launch crafts 10a in FIG. 1.
$v_x = 0.0$, $v_y = -700$ ft/sec;
$a_x = 92.8$ ft/sec$^2$; $a_y = 0.0$
$A_t = 98.21$ ft/sec$^2$; and $G = 3.05$ In Example 1, the launch crafts 10 approach Mach I for take off on flight path 12 without using on board fuel under a g force of about 3.05. If the radius r were reduced to 2640 ft which is about 0.5 mile, then the velocity V would be 495 ft/sec or 338 mph under a g force of 3.05. In this event, the load would be diverted to the involute curve 5a for the final acceleration to 700 ft/sec.

The tradeoff advantages between the two designs (circular vs circular with connecting involute) in example 1 will be left undecided since they are affected by costs and the use that is made of the invention. However, it should be noted that an increase of one unit of radius of the circular guideway 5 results in a circumferential increase by a factor of about 6.2.

Further discussion will be essentially restricted to take off from circular guideway 5. At takeoff, the launch crafts 10a, comprised of spacecraft 1 and aircraft 2, become airborne along path 12. They are powered to staging altitude by the engines 3. The engines 3 can be started and checked out at any time before takeoff. The load can remain on the guideway, at takeoff speed, until the check is completed. If there is a malfunction, the entire load 4 remains on the guideway 5 and is safely slowed to a stop by alternating the force fields of the propulsion magnets in reverse which also regenerates the energy in load 4.

At staging altitude, the rocket engines on spacecraft 1 are started and the spacecraft is separated from the aircraft 2 at the couplings 6. Separation could be done with exploding bolts. The spacecraft 1 will be at a substantially high altitude and speed before its on board fuel is used which minimizes the fuel load and increases rocket engine efficiency relative to rocket powered vertical takeoff from a standstill on the ground. After separation, the spacecraft continues into space under its own rocket engine power while the aircraft 2 descends to a normal landing on runway 24 where it is made ready for another launch. Preferably, the runway 24 is constructed to accommodate any spacecraft 1 that returns. Notice that all major parts of the launch system in this invention are recoverable for reuse.

At takeoff, the launch crafts 10a separate from the MAGLEV vehicle 4a as shown in FIG. 1. The MAGLEV vehicle is then slowed by alternating the polarities of the propulsion magnets in reverse. This procedure also allows some of the kinetic energy in the MAGLEV vehicle to be regenerated. Switch 35 at the intersection of the guideway 5 and the off-ramp 11 permits the MAGLEV vehicle to proceed along the off-ramp. Part of the off-ramp is designed to allow the slowed down MAGLEV to come to rest on wheels attached to the off-ramp. A set of wheels can then be attached to the MAGLEV vehicel which would then be pushed from the ramp 11 onto tracks 25 and into the maintenance building 23 where inspection, maintenance or repairs are made in preparation for the next mission. For a mission, the MAGLEV vehicle 4 is pushed back onto ramp 11 and to the loading point through the switch 45.

Notice the design latitude and compact efficiency that the invention offers for a launch and ascent system. Notice also how the invention avoids the major cost and technical disadvantages inherent in MAGLEV train systems by using the supercooled magnets for only a short time during each mission and a relatively short length guideway.

Other forms and embodiments of this invention include:

1. a linear guideway 5 in which the MAGLEV 4 is returned to a start position at one end after launching the crafts 10 from the opposite end.

2. Capturing regenerated braking energy from the MAGLEV 4 by reversing the magnets polarities.

3. A single craft 10 having air breathing engines for atmospheric power and rocket engines for final thrust into space.

4. Launching conventional aircraft from the MAGLEV 4.

It is to be emphasized, then, that the invention is not to be limited to the preferred embodiment selected for description herein but includes the full scope and intent of the claims.

I claim:

1. An apparatus for launching a vehicle, the combination comprising:
   a guideway, the guideway including a curve along at least a portion of its length;
   a load, the load comprising a first vehicle and at least one additional vehicle;
   a magnetic force field between the first vehicle and the guideway for propulsion of the load along the guideway, the propulsion including an acceleration of the load;
   a relatively shallow bank of the guideway along the curve toward the inside thereof for providing centripetal force to the load at lower velocities;
   a releasable engagement between the first vehicle and the additional vehicle, the engagement permitting a variable tilt therebetween; the tilt restricted essentially toward the inside of the curve transverse to a tangent thereof during at least a part of the propulsion;
   the additional vehicle characterized by aerodynamic lift surfaces thereupon; and
   the tilt of the additional vehicle effecting centripetal force thereupon by the aerodynamic lift at higher velocities wherein the load is accelerated to a velocity for releasing the engagement to launch the additional vehicle.

2. The combination of claim 1 in which the engagement includes
   a swivel for effecting the tilt; and
   the degree of tilt is substantially effected by the lift surfaces.

3. The combination of claim 1 in which the additional vehicle includes a power means for self propulsion after launch.

4. The combination of claim 3 which includes:
   a third vehicle;
   a releasable coupling between the additional vehicle and the third vehicle;
   the additional vehicle propelling the third vehicle to a staging altitude essentially within an atmosphere;
   the third vehicle includes a self propelling means for propulsion essentially outside the atmosphere; and
   the coupling is released near the staging altitude so that the third vehicle self propels outside the atmosphere.

5. The combination of claim 1 in which:
   the curve includes a substantially circular part;
   the guideway includes a substantially linear section, the section extending essentially along a tangent of the circular part;
   a first gate switch operatively coupling the section with the circular part for moving the load therebetween;
   the curve further includes a substantially spiral part, the spiral part having an essentially common center with the circular part;
   a second gate switch operatively coupling the circular part with the spiral part at a substantially smallest angle therebetween; and
   the propulsion comprises a first acceleration along the section, a second acceleration along the circular part and a final acceleration to the launch velocity along the spiral part.

6. The combination of claim 1 wherein the guideway includes a linear section and means for operatively coupling the linear section and the curve.

* * * * *